United States Patent [19]

Lettau

[11] Patent Number: 5,793,832
[45] Date of Patent: Aug. 11, 1998

[54] NUCLEAR REACTOR FUEL ASSEMBLY SPACER

[75] Inventor: Hans Lettau, Effeltrich, Germany

[73] Assignee: Siemens Aktiengesellschaft, Munich, Germany

[21] Appl. No.: 814,636

[22] Filed: Mar. 10, 1997

Related U.S. Application Data

[63] Continuation of PCT/DE95/01145 Aug. 28, 1995.

[30] Foreign Application Priority Data

Sep. 9, 1994 [DE] Germany ............... 44 32 147.3

[51] Int. Cl.$^6$ .................................................. G21C 3/356
[52] U.S. Cl. ............................................................ 376/442
[58] Field of Search ........................... 376/441, 442, 376/462

[56] References Cited

U.S. PATENT DOCUMENTS 3,769,159 10/1973 Zinn et al. ............................ 376/441
4,396,573 8/1983 Feutrel ................................... 376/442
5,243,635 9/1993 Bryan .................................... 376/442

FOREIGN PATENT DOCUMENTS 25395 3/1983 Germany.
0 080 853 6/1983 Germany.

*Primary Examiner*—Daniel D. Wasil
*Attorney, Agent, or Firm*—Herbert L. Lerner; Laurence A. Greenberg

[57] ABSTRACT

A spacer for a nuclear reactor fuel assembly includes sheet metal webs which intersect one another on edge and form grid meshes. A leaf spring projects from a sheet metal web in a grid mesh and is assigned to a bearing boss for the force-locking holding of a rod in the grid mesh. The leaf spring is attached to the sheet metal web at a leaf edge extending in the longitudinal direction of the rod. In order to avoid fretting in a nuclear reactor, a perforation is formed in the leaf spring and has a contour that narrows toward the sheet metal web to which the leaf spring is attached.

9 Claims, 5 Drawing Sheets

NUCLEAR REACTOR FUEL ASSEMBLY SPACER

CROSS-REFERENCE TO RELATED APPLICATION

This application is a Continuation of International Application Ser. No. PCT/DE95/01145, filed Aug. 28, 1995.

BACKGROUND OF THE INVENTION

Field of the Invention

The invention relates to a spacer for a nuclear reactor fuel assembly, including sheet metal webs which intersect one another on edge and form grid meshes, a bearing boss on a sheet metal web in a grid mesh, and a leaf spring which projects from a sheet metal web and is assigned to the bearing boss for the force-locking holding of a rod, the leaf spring is attached to the sheet metal web in the grid mesh at a leaf edge extending in the longitudinal direction of that grid mesh.

Such a spacer is known from Published European Patent Application 0 080 853 A3, corresponding to U.S. Pat. No. 4,897,241. The contour of the leaf spring of that known spacer narrows toward that end of the leaf spring which projects into the grid mesh and through the use thereof the rod located in the grid mesh is held force-lockingly on the bearing boss. A force-locking connection is one which locks elements together by force external to the elements, as opposed to a form-locking connection which locks the elements together due to the shape of the elements themselves. The surface with which the leaf spring bears on the rod in the grid mesh is relatively small, so that there is the risk that, in the reactor core of a nuclear reactor through which a coolant flows, the leaf spring will experience fatigue very quickly and a lateral knocking of the rod located in the grid mesh against the leaf spring, which is so-called "fretting" will occur and cause damage to the rod.

SUMMARY OF THE INVENTION

It is accordingly an object of the invention to provide a spacer for a nuclear reactor fuel assembly and a nuclear reactor fuel assembly having the spacer, which overcome the hereinafore-mentioned disadvantages of the heretofore-known devices of this general type and which avoid fretting.

With the foregoing and other objects in view there is provided, in accordance with the invention, a spacer for a nuclear reactor fuel assembly, comprising sheet metal webs intersecting one another on edge and forming grid meshes; a bearing boss disposed on one of the sheet metal webs in one of the grid meshes; and a leaf spring projecting from one of the sheet metal webs and being associated with the bearing boss for force-lockingly holding a rod, the leaf spring having a leaf edge attached to the sheet metal web in the grid mesh, the leaf edge extending in longitudinal direction of the grid mesh, and the leaf spring having a perforation formed therein with a contour narrowing toward the sheet metal web to which the leaf spring is attached.

Due to the perforation in the leaf spring and the contour of the perforation narrowing toward the sheet metal web, a plasticization of the material of the leaf spring can be avoided under the operating conditions in a nuclear reactor, at least to such an extent that the leaf spring always automatically bears constantly on the rod in the grid mesh, even when the spacer is in use in a nuclear reactor for long periods of time, and consequently "fretting" is ruled out.

In accordance with another feature of the invention, the leaf spring has an outer contour widening toward the sheet metal web to which the leaf spring is attached. Through the use of this advantageous development, the mechanical load on the leaf spring is kept optimally low at its leaf edge attached to the sheet metal web and the leaf spring consequently ages particularly slowly.

In accordance with a further feature of the invention, the leaf spring has a rectangular outer contour. This structure provides the aforementioned advantage as well as the additional advantage of causing the leaf spring to bear on the rod located in the grid mesh over an optimally long length, thereby likewise suppressing fretting.

In accordance with an added feature of the invention, the leaf spring is bent at a leaf edge projecting into the grid mesh to form a bending edge disposed between the leaf edge and the perforation, and the leaf spring is bent relative to the sheet metal web to which the leaf spring is attached.

In accordance with an additional feature of the invention, the leaf spring has a resilient transverse strip disposed between the bending edge and the leaf edge projecting into the grid mesh.

In accordance with yet another feature of the invention, the bearing boss is a sheet metal strip having an end edge projecting from the sheet metal web and having a spring constant higher than that of the leaf spring. This development brings about not only an optimally low flow resistance of the spacer in a nuclear reactor fuel assembly, through which a cooling liquid flows in the longitudinal direction in a nuclear reactor, but also a long-lasting play-free force-locking retention of a rod in the grid mesh. This likewise rules out fretting.

In accordance with yet a further feature of the invention, the sheet metal strip forming the bearing boss has a transversely extending bending edge at which the sheet metal strip is bent relative to the sheet metal web from which the sheet metal strip forming the bearing boss projects.

In accordance with yet a further feature of the invention, there is provided a resilient transverse strip disposed between the end edge of the sheet metal strip projecting from the sheet metal web and the bending edge.

With the objects of the invention in view there is also provided a nuclear reactor fuel assembly, comprising the spacer as described above.

Other features which are considered as characteristic for the invention are set forth in the appended claims.

Although the invention is illustrated and described herein as embodied in a spacer for a nuclear reactor fuel assembly and a nuclear reactor fuel assembly having the spacer, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
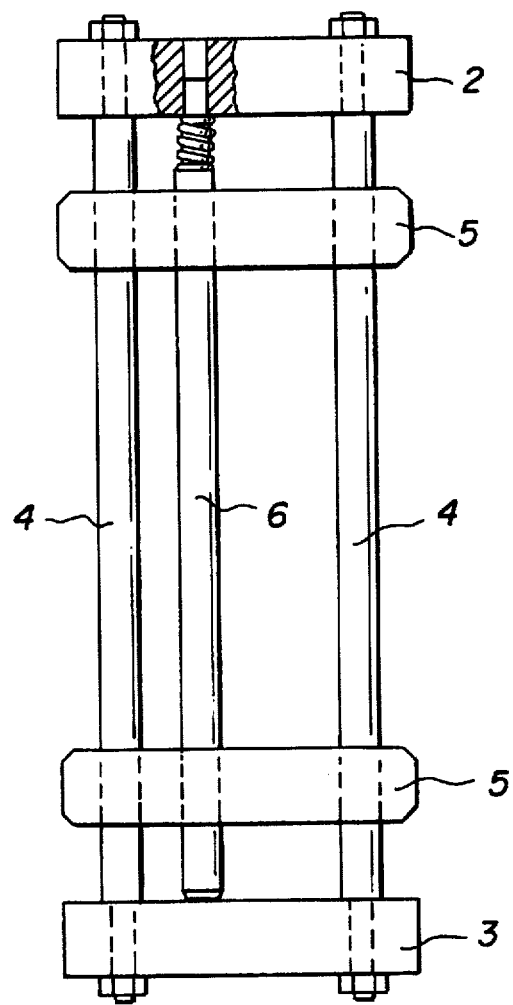
FIG. 1 is a diagrammatic, partly broken-away, side-elevational view of a nuclear reactor fuel assembly for a boiling-water nuclear reactor, although the invention is also suitable for a pressurized-water nuclear reactor.

Referring now to the figures of the drawings in detail and first, particularly, to FIG. 1 thereof, there is seen a nuclear reactor fuel assembly for a boiling-water nuclear reactor, which has a fuel assembly head 2 and a fuel assembly foot 3. Furthermore, two fuel rods 4 filled with nuclear fuel can be seen. Each of the fuel rods 4 is firmly screwed at one end to the fuel assembly head 2 and at the other end to the fuel assembly foot 3. Each of the two fuel rods 4 is guided in each case through a mesh or opening in grid-shaped spacers 5 which are disposed at a distance from one another between the fuel assembly head 2 and the fuel assembly foot 3 and which are form-lockingly retained or firmly welded to the fuel rods 4 on the outside.

Further fuel rods which are filled with nuclear fuel and of which only a single fuel rod 6 is shown in FIG. 1, are disposed parallel to one another and parallel to the fuel rods 4 between the fuel assembly head 2 and the fuel assembly foot 3. Each fuel rod 6 is guided in each case through a grid mesh of the grid-shaped spacer 5 and is retained force-lockingly in these grid meshes. Each fuel rod 6 stands loosely on the fuel assembly foot 3 and passes loosely through the fuel assembly head 2.

Figure 2:
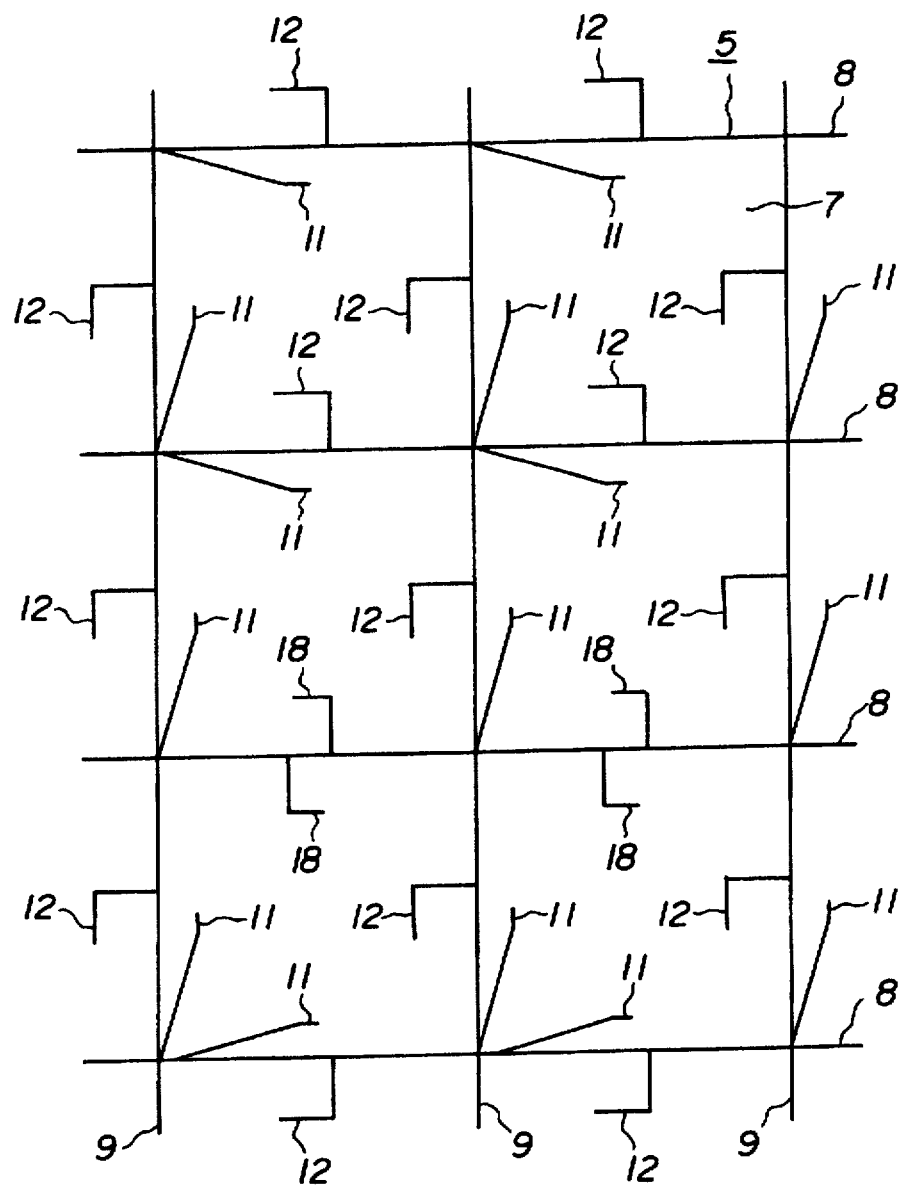
FIG. 2 is a highly diagrammatic top-plan view of part of a grid-shaped spacer of a nuclear reactor fuel assembly according to FIG. 1.

As is shown in FIG. 2, a grid-shaped spacer 5 has grid meshes 7, each with a square cross section. The grid-shaped spacer 5 has sheet metal webs 8 and 9 which intersect on edge and of which the sheet metal webs 8 of a first group are mutually parallel and disposed at right angles to the mutually parallel sheet metal webs 9 of a second group.

In each case two leaf springs 11 project into each grid mesh 7 of the spacer 5. The leaf springs 11 are assigned in each case to two bearing bosses 12 and 18 in each grid mesh 7 for the force-locking holding of a rod, for example a fuel rod 4 or 6, that is not shown in FIG. 2.

Figure 3:
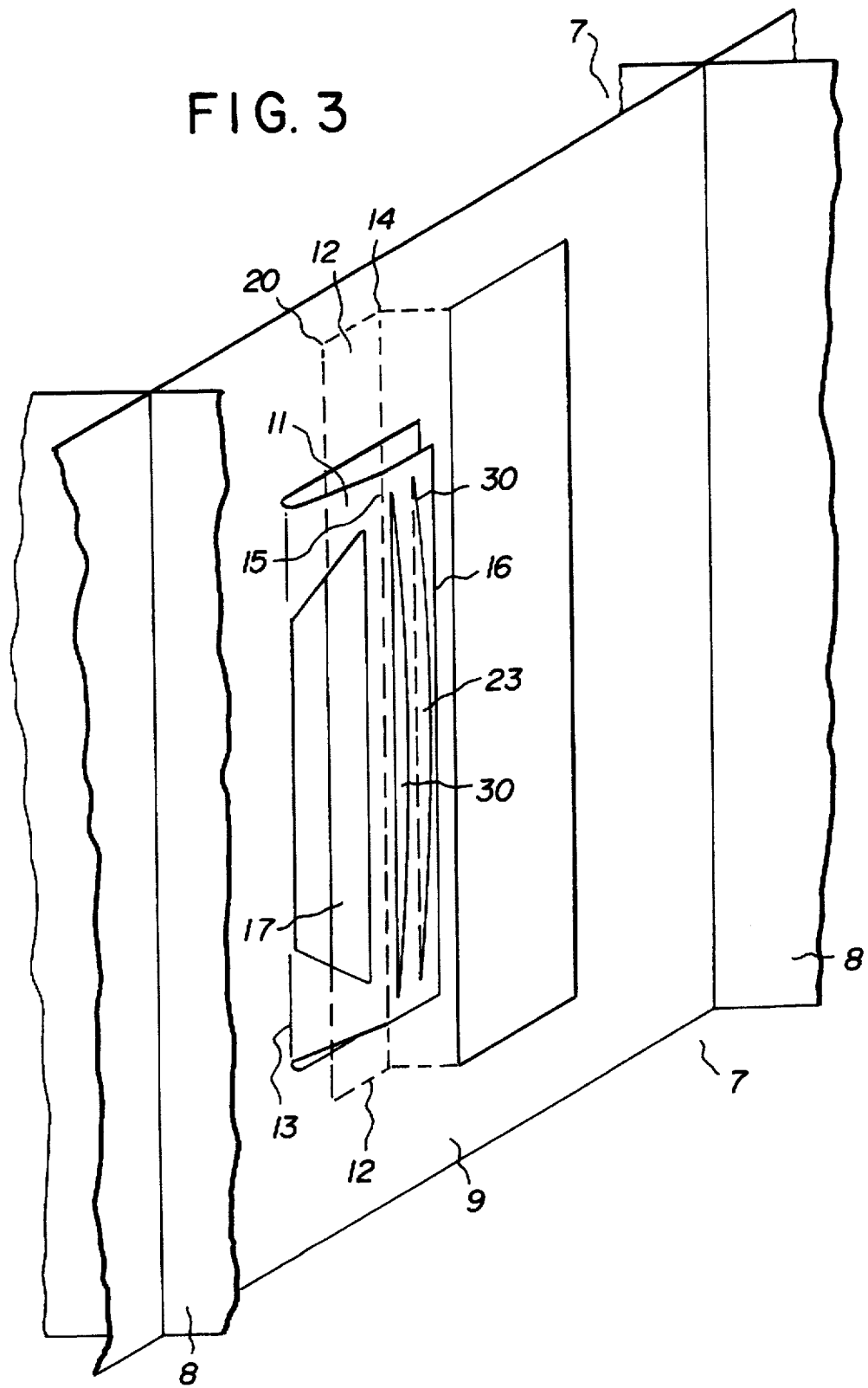
FIG. 3 is a fragmentary, perspective view of a wall of a grid mesh of the grid-shaped spacer according to FIG. 2.

FIG. 3 shows a wall of a grid mesh 7 at a point on a sheet metal web 9 at which a leaf spring 11 is located on one side of this sheet metal web 9 in a grid mesh 7, and a bearing boss 12 is located on the other side of the sheet metal web 9 in another grid mesh 7, as seen in FIG. 2.

As FIG. 3 further shows, the outer contour of the leaf spring 11 is a rectangle. The leaf spring 11 which is cut out from the sheet metal web 9 is bent onto one side of the sheet metal web 9 into one of the grid meshes 7 about a (long) leaf edge 13 extending in the longitudinal direction of the grid meshes 7. The leaf spring 11 thus projects from the sheet metal web 9. On the other side of the sheet metal web 9, a bearing boss 12 is bent into another adjacent grid mesh 7 about a bending edge which is located in the sheet metal web 9 and which extends in the longitudinal direction of the grid meshes 7. This bearing boss 12 is a sheet metal strip which is cut out from the sheet metal web 9 and which has a bending edge 14 that runs transversely, that is to say in the longitudinal direction of the grid meshes 7, and an end edge 20 which likewise runs in the longitudinal direction of the grid mesh 7 and with which the sheet metal strip projects from the sheet metal web 9. At the bending edge 14, the sheet metal strip is inclined relative to the sheet metal web 9, from which the bearing boss 12 projects.

As FIG. 3 further shows, the leaf spring 11 also has a bending edge 15. Along this bending edge 15 which runs transversely relative to the leaf spring 11, that is to say parallel to the longitudinal direction of the grid meshes 7, the leaf spring 11 is inclined relative to the sheet metal web 9, to which it is attached and from which it projects.

Moreover, the leaf spring 11 has a perforation 17 with the contour of an equal-angled trapezium, the mutually parallel bases of which are parallel to the longitudinal direction of the grid meshes 7. The contour of the perforation 17 narrows in the direction of the bending edge 13, at which the leaf spring 11 is attached to the sheet metal web 9. The smaller base of the equal-angled trapezium lies along this bending edge 13. The bending edge 15 of the leaf spring 11 is located between the perforation 17 and a (long) leaf edge 16 of the leaf spring 11. The leaf edge projects into one of the grid meshes 7.

On one of the sheet metal webs 8 of the spacer grid 5 illustrated in FIG. 2, two bearing bosses 18 are formed on one wall between two other grid meshes 7.

Figure 4:
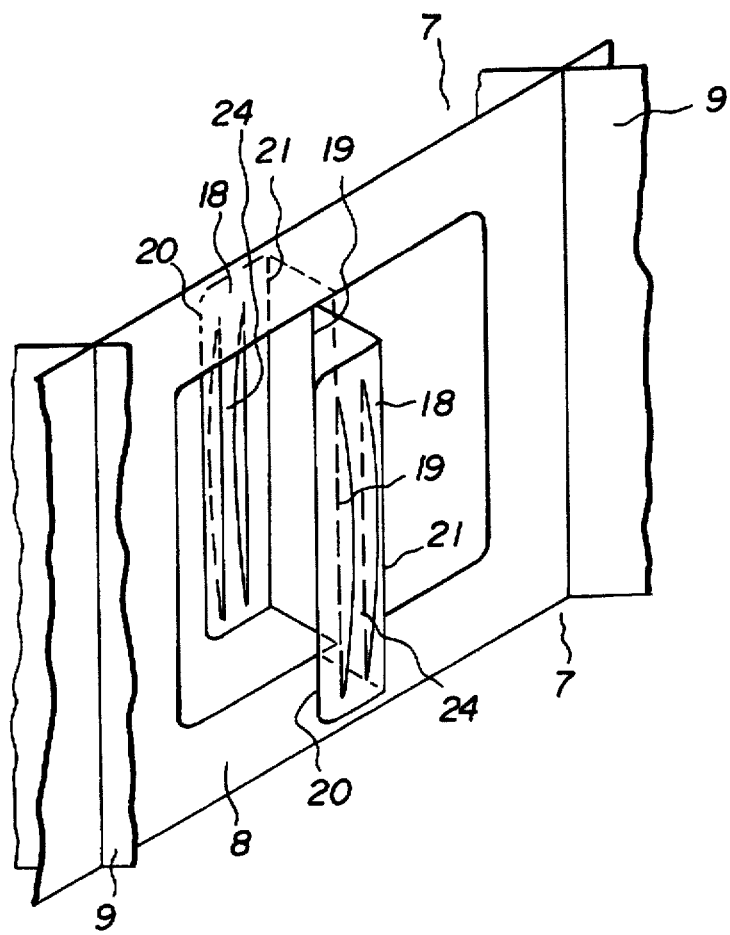
FIG. 4 is a fragmentary, perspective view of another wall of a grid mesh of the grid-shaped spacer according to FIG. 2.

As is shown in FIG. 4, each of these two bearing bosses 18 is composed of a sheet metal strip which is cut out from the sheet metal web 8 on one wall of a grid mesh 7 in each case and which is bent in each case into one of two adjacent grid meshes 7 at a bending edge 19 in the sheet metal 8. The bending edge is parallel to the longitudinal direction of the grid meshes 7. Each of the two bearing bosses 18 has a bending edge 21 in the sheet metal strip, between the bending edge 19 and its end edge 20 projecting from the sheet metal web 8. The bending edge 21 is parallel to the longitudinal direction of the grid meshes 7 and therefore also parallel to the bending edges 19 and along the bending edge 21 the sheet metal strip of the bearing bosses 18 in each case is bent with the end edge 20 relative to the sheet metal web 8, to which the sheet metal strip is attached.

The leaf spring 11 according to FIG. 3 forms a bearing surface between the bending edge 15 and the end edge 16, for example for a fuel rod 6 that is filled with nuclear fuel and is located within the grid mesh 7, into which the leaf spring 11 projects. In a similar way, according to FIG. 4, the bearing bosses 18 form a bearing surface between the bending edge 21 and the end edge 20 which is likewise for a fuel rod that is disposed in the adjacent grid mesh 7, is filled with nuclear fuel and extends with its longitudinal axis in the longitudinal direction of the grid meshes 7. The spring constant of a leaf spring 11 and of a bearing boss 12 or 18 is determined by the quotient of a force engaging on the end edge 16 of the leaf spring 11 or the edge 20 of the bearing bosses 12 or 18 and the spring excursion caused by this force. The force and the spring excursion in each case are directed at right angles to that wall of the grid meshes to which the leaf spring or the bearing boss is attached. The smaller the area of the perforation 17 of a leaf spring 11, the harder this leaf spring 11 is, that is to say the higher its spring constant is. Thus, by selecting the size of the area of the perforation 17, the spring constant of the leaf spring 11 can be lower than the spring constant of the bearing boss 12 or 18 assigned to this leaf spring 11 in a grid mesh 7, so that a fuel rod disposed in this grid mesh 7 finds a leaf spring 11 which is more elastically resilient than the bearing boss 12 or 18 that is assigned to this leaf spring 11. It thereby becomes possible for a fuel rod 6 to be held force-lockingly at a fixed location in a grid mesh of a grid-shaped spacer 5, even in a reactor core in which a liquid coolant constantly flows in the longitudinal direction of the fuel rods through a nuclear reactor fuel assembly having this fuel rod 6 and this spacer 5.

In a favorable way, as is shown in FIG. 3, a resilient transverse strip 23 can be formed out of the leaf spring 11 through the use of two spaced transverse slits 30 between the bending edge 15 and the end edge 16 that projects from the sheet metal web 9 and is part of the leaf spring 11. In a similar way, as is shown in FIG. 4, such a resilient transverse strip 24 can be formed between the end edge 20 and the bending edge 21 of the bearing bosses 18. In the same way, the bearing boss 12 according to FIG. 3 can also have such a resilient transverse strip. These resilient transverse strips form a linear, elastic, flexible bearing point on a rod, for example a fuel rod 6, which is disposed in the grid meshes and onto which the strips are curved, so that "fretting" is avoided with an even greater degree of safety.

The side surfaces both of the leaf springs and of the bearing bosses of the grid-shaped spacer extend in the longitudinal direction of the grid meshes. A liquid coolant also flows in this longitudinal direction through a nuclear reactor fuel assembly having such a spacer grid in the reactor core of a nuclear reactor. Accordingly, the leaf springs 11 and the bearing bosses 12 and 18 oppose only little flow resistance to this flow.

Figure 5:
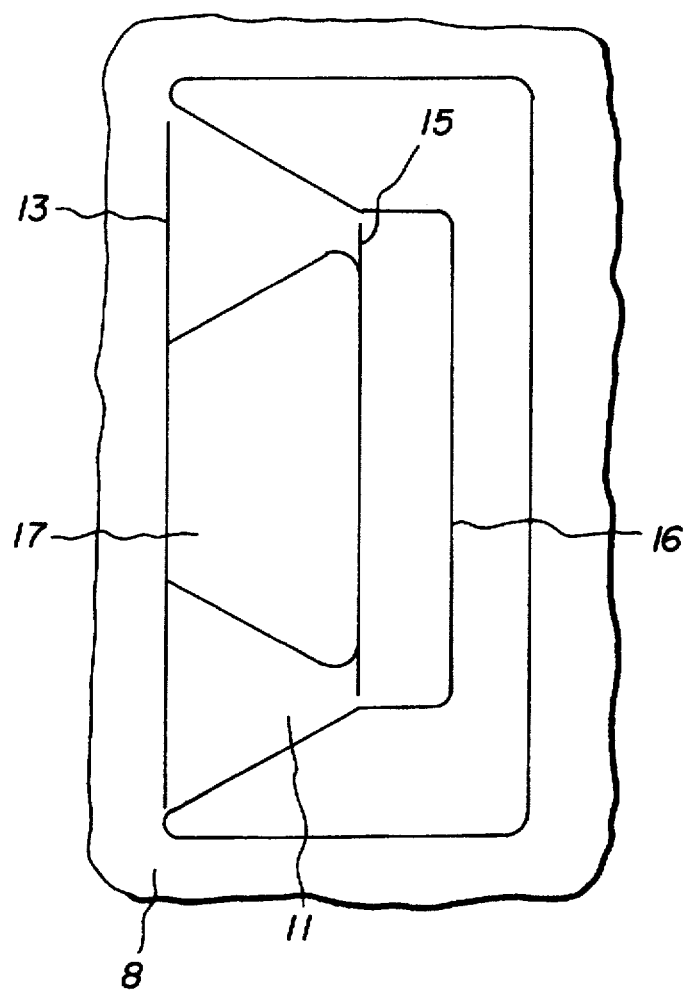
FIG. 5 is a fragmentary, side-elevational view of a modification of the wall according to FIG. 3.

FIG. 5, in which like parts are provided with the same reference symbols as in FIG. 3, shows a leaf spring 11 which widens toward the sheet metal web 8 of a grid-shaped spacer, which is the sheet metal web to which this leaf spring 11 is attached. This leaf spring 11 has an equal-angled trapezium as an outer contour and a (long) leaf edge 13 in the longitudinal direction of the grid meshes. The leaf spring 11 is bent out of the sheet metal web 8 about the leaf edge 13 into a grid mesh.

I claim:

1. A spacer for a nuclear reactor fuel assembly, comprising:
   sheet metal webs intersecting one another on edge and forming grid meshes;
   a bearing boss disposed on one of said sheet metal webs in one of said grid meshes; and
   a leaf spring being associated with said bearing boss for force-lockingly holding a rod, said leaf spring having a first leaf edge and a second leaf edge both extending in a longitudinal direction of the rod, said leaf spring projecting from one of said sheet metal webs and being attached to said sheet metal web by said first leaf edge, said leaf spring further having a perforation formed therein with a contour narrowing toward said sheet metal web to which said leaf spring is attached.

2. The spacer according to claim 1, wherein said leaf spring has an outer contour widening toward said sheet metal web to which said leaf spring is attached.

3. The spacer according to claim 1, wherein said leaf spring has a rectangular outer contour.

4. The spacer according to claim 1, wherein said second leaf edge is an end edge projecting into said grid mesh, said leaf spring has a bending edge disposed between said second leaf edge and said perforation, said leaf spring is bent at said bending edge towards said sheet metal web to which said leaf spring is attached.

5. The spacer according to claim 4, wherein said leaf spring has a resilient strip disposed between said bending edge and said second leaf edge, said resilient strip extending in said longitudinal direction of the rod and said resilient strip has a bulge extending towards the rod.

6. The spacer according to claim 1, wherein said bearing boss is a sheet metal strip having an end edge projecting from said sheet metal web and having a spring constant higher than that of said leaf spring.

7. The spacer according to claim 6, wherein said sheet metal strip forming said bearing boss has a transversely extending bending edge extending in said longitudinal direction of the rod, said sheet metal strip is bent relative to said sheet metal web from which said sheet metal strip forming said bearing boss projects.

8. The spacer according to claim 7, including a transverse strip disposed between said end edge of said sheet metal strip projecting from said sheet metal web and said bending edge, said resilient strip extending in said longitudinal direction of said rod and said resilient strip has a bulge extending towards the rod.

9. A nuclear reactor fuel assembly, comprising:
   a spacer including:
     sheet metal webs intersecting one another on edge and forming grid meshes;
     a bearing boss disposed on one of said sheet metal webs in one of said grid meshes; and
     a leaf spring projecting from one of said sheet metal webs and being associated with said bearing boss for force-lockingly holding a rod, said leaf spring having a leaf edge attached to said sheet metal web, said leaf edge extending in longitudinal direction of the rod, and said leaf spring having a perforation formed therein with a contour narrowing toward said sheet metal web to which said leaf spring is attached.

* * * * *